(12) United States Patent
Porikli et al.

(10) Patent No.: US 7,142,602 B2
(45) Date of Patent: Nov. 28, 2006

(54) METHOD FOR SEGMENTING 3D OBJECTS FROM COMPRESSED VIDEOS

(75) Inventors: Fatih M. Porikli, Watertown, MA (US); Huifang Sun, Cambridge, MA (US); Ajay Divakaran, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 748 days.

(21) Appl. No.: 10/442,417

(22) Filed: May 21, 2003

(65) Prior Publication Data

US 2004/0233987 A1    Nov. 25, 2004

(51) Int. Cl.
*H04B 1/66* (2006.01)
(52) U.S. Cl. .................................. 375/240.16
(58) Field of Classification Search ........... 375/240.01, 375/240.12, 240.16, 240.19; 382/173, 291; 345/419
See application file for complete search history.

(56) References Cited

U.S. PATENT DOCUMENTS

| | | | |
|---|---|---|---|
| 6,597,739 B1 * | 7/2003 | Li et al. ................ | 375/240.19 |
| 6,611,262 B1 * | 8/2003 | Suzuki .................... | 345/419 |
| 6,621,939 B1 * | 9/2003 | Negishi et al. ........... | 382/291 |
| 6,859,554 B1 * | 2/2005 | Porikli et al. ............. | 382/173 |

OTHER PUBLICATIONS

R. de Queiroz, Z. Fan, and T. Tran. Optimizing blockthresholding segmentation for multilayer compression of compound images. IEEE Trans. Image Proc, 2000.
M. Flickner, H. Sawhney, W. Niblack, J. Ashley, Q. Huang, B. Dom, M. Gorkani, J. Hafner, D. Lee, D. Petkovic, D. Steele, and P. Yanker. Query by image and video content. IEEE Computer, pp. 23-31, 1995.
H. Wang and S. Chang. Automatic face region detection in mpeg video sequences. Electronic Imaging and Multimedia Systems, SPIE Photonics China, 1996.
O. Sukmarg and K. Rao. Fast object detection and segmentation in mpeg compressed domain. IEEE TENCON 2000, Kuala Lumpur, Malaysia,, Sep. 2000.
J. Meng and S.F. Chang, CVEPS—a compressed video editing and parsing system, Proceedings of the fourth ACM international conference on Multimedia, 43-53, 1996.
F. Arman, A. Hsu, and M. Chiu. Image processing on compressed data for large video databases. ACM Multimedia, pp. 267-272, 1993.

* cited by examiner

*Primary Examiner*—Tung Vo
(74) *Attorney, Agent, or Firm*—Dirk Brinkmen; Clifton D. Mueller; Gene V. Vinouur (57) ABSTRACT

A method segments a video into objects, without user assistance. An MPEG compressed video is converted to a structure called a pseudo spatial/temporal data using DCT coefficients and motion vectors. The compressed video is first parsed and the pseudo spatial/temporal data are formed. Seeds macro-blocks are identified using, e.g., the DCT coefficients and changes in the motion vector of macro-blocks.

A video volume is "grown" around each seed macro-block using the DCT coefficients and motion distance criteria. Self-descriptors are assigned to the volume, and mutual descriptors are assigned to pairs of similar volumes. These descriptors capture motion and spatial information of the volumes. Similarity scores are determined for each possible pair-wise combination of volumes. The pair of volumes that gives the largest score is combined iteratively. In the combining stage, volumes are classified and represented in a multi-resolution coarse-to-fine hierarchy of video objects.

23 Claims, 10 Drawing Sheets

METHOD FOR SEGMENTING 3D OBJECTS FROM COMPRESSED VIDEOS

FIELD OF THE INVENTION

This invention relates generally to segmenting videos, and more particularly to segmenting 3D objects from videos.

BACKGROUND OF THE INVENTION

It should be possible to analyze a compressed video without having to decompress the video. Analyzing a compressed video should take less effort because there is less data. However, in a compressed video, none of the original picture information such as the intensity of the pixel colors is available. When a video is compressed according to the MPEG standards, the bit stream is converted to I-, B-, and P-frames. The I-frames store DCT information of original video frames, and the B- and P-frames store motion information and residuals after motion compensation. Although, I-frames do not store motion information, static color and texture information can be propagated to the B- and P-frames by inverse motion compensation.

Compressed videos have several important characteristics useful for object analysis. First, motion information is readily available without having to estimate the motion field. Second, DCT information express image characteristics. However, the motion vectors are often contaminated by mismatching. In addition, the motion fields in MPEG compressed bit streams are prone to quantization errors. Therefore, motion analysis on an uncompressed video provides better information. However, decompressing a video to recover the original information is very time consuming, and it might not be possible to do the required analysis of the compressed video in real time, if the video first has to be decompressed.

In the prior art, some methods are known for analyzing compressed images. One method segments JPEG documents into specific regions, such halftones, text, and continuous-tone pictures, see De Queiroz et al., "Optimizing block thresholding segmentation for multilayer compression of compound images," IEEE Trans. Image Proc. pp. 1461–1471, 2000. They used an encoding cost map based segmentation. However, the JPEG standard only deals with single still images. Therefore, it is not possible to segment arbitrary 3D objects from still images.

Wang et al., in "Automatic face region detection in MPEG video sequences," Electronic Imaging and Multimedia Systems, SPIE Photonics, 1996. described a process for detecting faces in an MPEG compressed video. They used chrominance, i.e., skin-tone statistics, face shape constraints, and energy distribution of the luminance values to detect and locate the faces. Their method is not general, and does not works for videos containing an unknown number of arbitrary objects of unknown color and shape.

Meng et al., in "Tools for compressed-domain video indexing and editing," SPIE Proceedings, 2670:180–191, 1996, used a block count method to estimate parameters in a three-parameter affine global motion model. Then, they performed global motion compensation to obtain object masks, and used histogram clustering to deal with multiple objects.

Sukmarg et al., in "Fast algorithm to detect and segmentation in MPEG compressed domain," IEEE TENCON, 2000, described an algorithm for detecting and segmenting foreground from background in an MPEG compressed video using motion information. Their segmentation has four main stages, initial segmentation with sequential leader and adaptive k-means clustering, region merging based on spatio-temporal similarities, foreground-background classification, and object detail extraction. Initial segmented regions are generated from 3D spatial information based on DC image and AC energy data. That information is used to cluster the image. After clusters are obtained, adaptive k-means clustering is applied until no more changes occur in each cluster. A temporal similarity is derived based on a Kolmogorov-Smirnov hypothesis test of the distribution of the temporal gradient, see An et al., "A Kolmogorov-Smirnov type statistic with applications to test for normality in time series," International Statistics Review, 59:287–307, 1991. The hypothesis test measures the overall difference between two cumulative distribution functions. The spatio-temporal similarities are used to construct a similarity graph between regions. The graph is thresholded and clustered. A first clustering stage is used to merge regions, which form cycles in the graph. A second clustering stage is used to merge regions based on the number of graph edges connecting between an interested cluster and its neighbor cluster, and those connecting within the interested cluster itself.

An essential step in video segmentation is partitioning the video into sequences of images called scenes or 'shots'. A shot is a sequence of images that is consistent in terms of content. Typically, a shot comprises a sequence of frames between a camera shutter opening and closing. Shots have been identified as a fundamental unit of a video, and their detection is an initial task in video segmentation. Numerous techniques are known for shot detection.

After shots are identified, it is possible to analyze their content based on motion, color, texture and others features.

Shot detection can be data driven or model driven. The data driven methods fall into two classes. Those based on global features, and those based on spatially registered features of the images. Methods based on global features, i.e., color histograms, are insensitive to motion, however, they can fail to detect scene cuts when the images before and after the shot cut have similar global features. The methods based on spatially registered features are sensitive to moving objects, and can fail when the image is extremely slow or fast. The model driven approach is based on mathematical models.

Flickner et al., in "Query by image and video content," IEEE Computer, pages 23–31, 1995, described shot detection with a global representation, such as color histogram and spatially related features. It should be noted that colors are not directly available in the compressed domain.

Corridoni et al., in "Automatic video segmentation through editing analysis," Lecture Notes in Computer Science, 974:179–190, 1995, described a method based on a relative difference between frames. They expect a shot cut when a difference between two frames is much larger than a threshold difference between frames belonging to the same shot. The threshold value was determined experimentally.

Nagasaka et al., in "Automatic scene-change detection method for video works," Proc. $40^{th}$ National Con. Information Processing Society of Japan, 1990, applied a template matching technique and a $X^2$ test to the color histograms of two subsequent frames.

Arman et al, in "Image processing on compressed data for large video databases," ACM Multimedia, pp. 267–272, 1993, described a shot detection technique that operate directly on compressed video using known properties of the coefficients of the DCT.

More recent methods use DCT coefficients and motion vector information for shot detection, see Zhang et al., "Video parsing and browsing using compressed data," Multimedia Tools and Applications, 1(1):89–111, 1995, neural networks, see Ardizzone et al., "A real-time neural approach to scene cut detection," Proc. of IS-T/SPIE—Storage and Retrieval for Image and Video Databases IV, 1996, and reduced image sequences, see Yeo et al., in "Rapid scene change detection on compressed video," IEEE Transactions on Circuits and Systems for Video Technology, 5:533–544, 1995.

Although those methods are sufficient for segmenting a video into shots, they are insufficient for segmenting 3D objects from compressed videos.

SUMMARY OF THE INVENTION

The invention provides a method for segmenting a video into objects, without user assistance.

An MPEG compressed video is converted to a structure called a pseudo spatial/temporal data using DCT coefficients and motion vectors.

The compressed video is first parsed and the pseudo spatial/temporal data are formed. Seeds macro-blocks are identified using, e.g., the DCT coefficients and changes in the motion vector of macro-blocks.

A video volume is "grown" around each seed macro-block using the DCT coefficients and motion distance criteria. Self-descriptors are assigned to the volume, and mutual descriptors are assigned to pairs of similar volumes. These descriptors capture motion and spatial information of the volumes.

Similarity scores are determined for each possible pair-wise combination of volumes. The pair of volumes that gives the largest score is combined iteratively. In the combining stage, volumes are classified and represented in a multi-resolution coarse-to-fine hierarchy of video objects.

More specifically, the method according to the invention segments a video sequence of frames into video objects. Each frame is composed of macro-blocks. Feature vectors are assigned to each macro-block of the video. Next, selected macro-blocks are identified as seed macro-blocks. Macro-blocks adjacent to each seed macro-block are assembled into a corresponding volume of macro-blocks if the distance between the feature vector of the seed macro-block and the feature vector of the adjacent macro-blocks is less than a first predetermined threshold. It should be noted that any number of distance metrics can be used, e.g., Euclidian, Gaussian or Mahalanobis distance, the $l_1$, $l_2$ and $l_\infty$ norms, etc. As an advantage, the Mahalanobis distance is sensitive to inter-variable changes in the data.

After all macro-blocks have been assembled into volumes, a first score and self-descriptors are assigned to each volume. At this point, each volume represents a segmented video object.

The volumes are then sorted a high-to-low order according to the first scores, and further processed in the high-to-low order.

Second scores, dependent on the descriptors of pairs of adjacent volumes are determined. The volumes are iteratively combined if the second score passes a second threshold to generate a video object in a multi-resolution video object tree that completes when the combined volume or video object is the entire video.

BRIEF DESCRIPTION OF THE DRAWINGS

FIG. 11 is block diagram of a self descriptor; and

FIG. 12 is a block diagram of a mutual descriptor.

DETAILED DESCRIPTION OF THE PREFERRED EMBODIMENT

Figure 1:
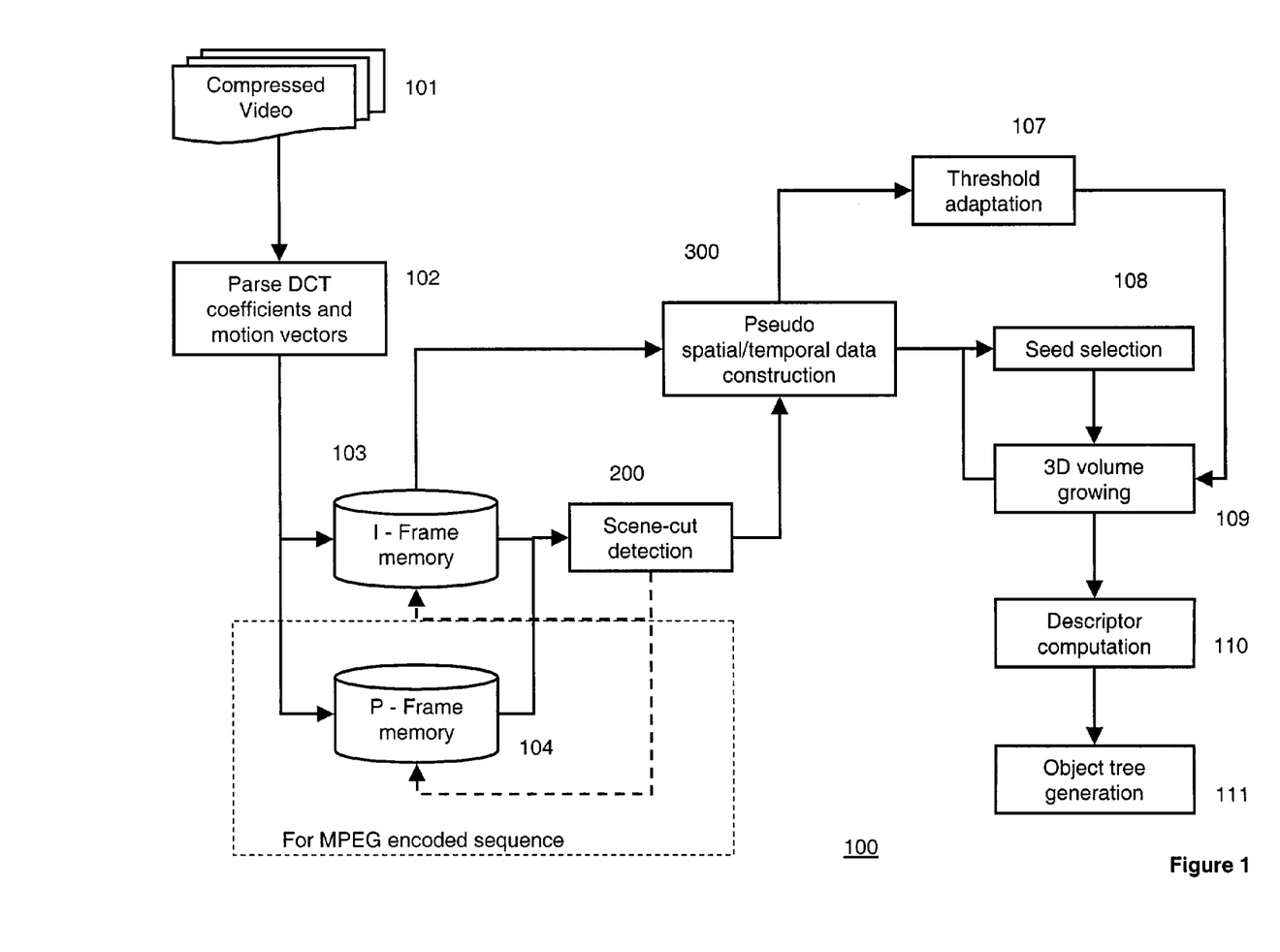
FIG. 1 is a block diagram of a method for segmenting a video into objects according to the invention.

FIG. 1 shows a method 100 for segmenting 3D objects 111 from a compressed video 101 according to the invention. The video 101 includes a sequence of 2D (spatial) frames arranged in a temporal order. The compressed video is first parsed 102 to obtain the DCT coefficients and motion vectors used to compress the original pixel intensity values. The DCT coefficients that are parsed from the compressed video are stored in an I-frame memory 103 and the parsed motion vectors are stored in a P-frame memory 104.

Although the example compressed video 101 that is used to describe the invention is compressed according to the widely used MPEG standard, it should be understood that the invention can also be applied to videos compressed according to other transformations, such as, fast Fourier transform (FFT), or wavelets. Therefore, when we say 'transformed coefficients' we means DCT coefficients, FFT coefficients, wavelet coefficients, motion coefficients, or any other reduced set of coefficients derived from the original pixel intensity values and pixel motion. If the video is in color, it is assumed that there is a set of transformed coefficients for each color channel.

A shot detector 200 finds the scene boundaries. Then, for the frames of the same shot, pseudo spatial/temporal data are constructed 300 from the transformed coefficients. Using this data, the thresholds of the volume growing stage are adapted 107.

To segment the pseudo spatial/temporal data, first a seed macro-block, i.e., a 'seed', is selected 108 based on a gradient magnitude of the transformed coefficients. Then, around this seed macro-block, a volume is grown 109 using the thresholds 107. This seed assignment and volume growing is iterated until no more macro-block remains in the data. Thus, the method according to the invention basically grows volumes around the transformed coefficients as found and parsed in the compressed domain.

For each volume, self-descriptors, and for a pair of volumes mutual-descriptors are determined 110. Using the descriptors, volumes are merged into objects using an object tree generation step 111 to build the tree 990. In the preferred embodiment, the actual volumes are stored as grown, i.e., only the bottom level leaf nodes of the tree are stored. The tree can then be used to merge the volumes from the bottom level leaf nodes to any desired level as needed for a specific application. For example, if the volumes are merged all the way up to the root node, only a single volumes remains.

Parsing

After a compressed MPEG video stream passes through conventional system layer multiplexer, vector length decoder (VLD) and inverse quantization (IQ) processes, the DCT coefficients of the I-frames and the motion vectors of the P-frames are queued in a bit stream. However, this data stream is still not a decoded video, but only a reorganized version of the initial stream, which can be obtained with minimal computational cost.

To obtain complete decoded frames of the video, it would be required to compute the color values of I-frames by applying an inverse discrete cosine transform (IDCT). To determine the color values of the P-frames, the motion compensation would be done using the motion vectors of the P-frames and the previously decoded I-frames. The interpolated B-frames could then be computed from the decoded I and P-frames according to their frame order. Finally, the residual would be decoded and added to all frames to recover the original video frames.

However, the parsing operation does not decode the video stream but only rearranges the binary numbers, applies the VLD and inverse quantization (IQ), and constructs blockwise ordered data. After parsing, we obtain the DCT coefficients of the macro-blocks of the I-frames, and the motion coefficients in the form of vectors of the corresponding macro-blocks of the P-frames. The I-frame DCT coefficients are assigned to 16×16 macro-blocks, and the motion vectors of the P-frames correspond to 16×16 macro-blocks for Y color channel. For the U and V color channels the block size is 8×8.

We denote the DCT coefficients as an array DCT(c,m,n,r,s,t) such that c represents the color channel (Y, U, V), (m,n) is the spatial index of the macro-block within the frame, (r,s) is the index of a DCT coefficient within the corresponding macro-block, and t is the frame number. For instance, DCT(V,22,35, 0,0,4) shows the (0,0) coefficient of the macro-block (22,35) of the V-channel of the frame 4. The dimension of the DCT matrix is 3*IM/16*IN/16*16*16*TI, where IM, IN are the original video frame size and TI is the number of I-frames in the scene.

The motion information of P-frames are organized into another array M(a,m,n,t) where a is either the x- or y-direction, (m,n) is the macro-block index, and t is the frame-number. For instance, M(x,22,30,4) is the horizontal motion magnitude of the macro-block (22,30) in the $4^{th}$ P-frame. The dimension of the motion data array M is 2*IM/16*IN/16*TP.

Shot Detection

Figure 2:
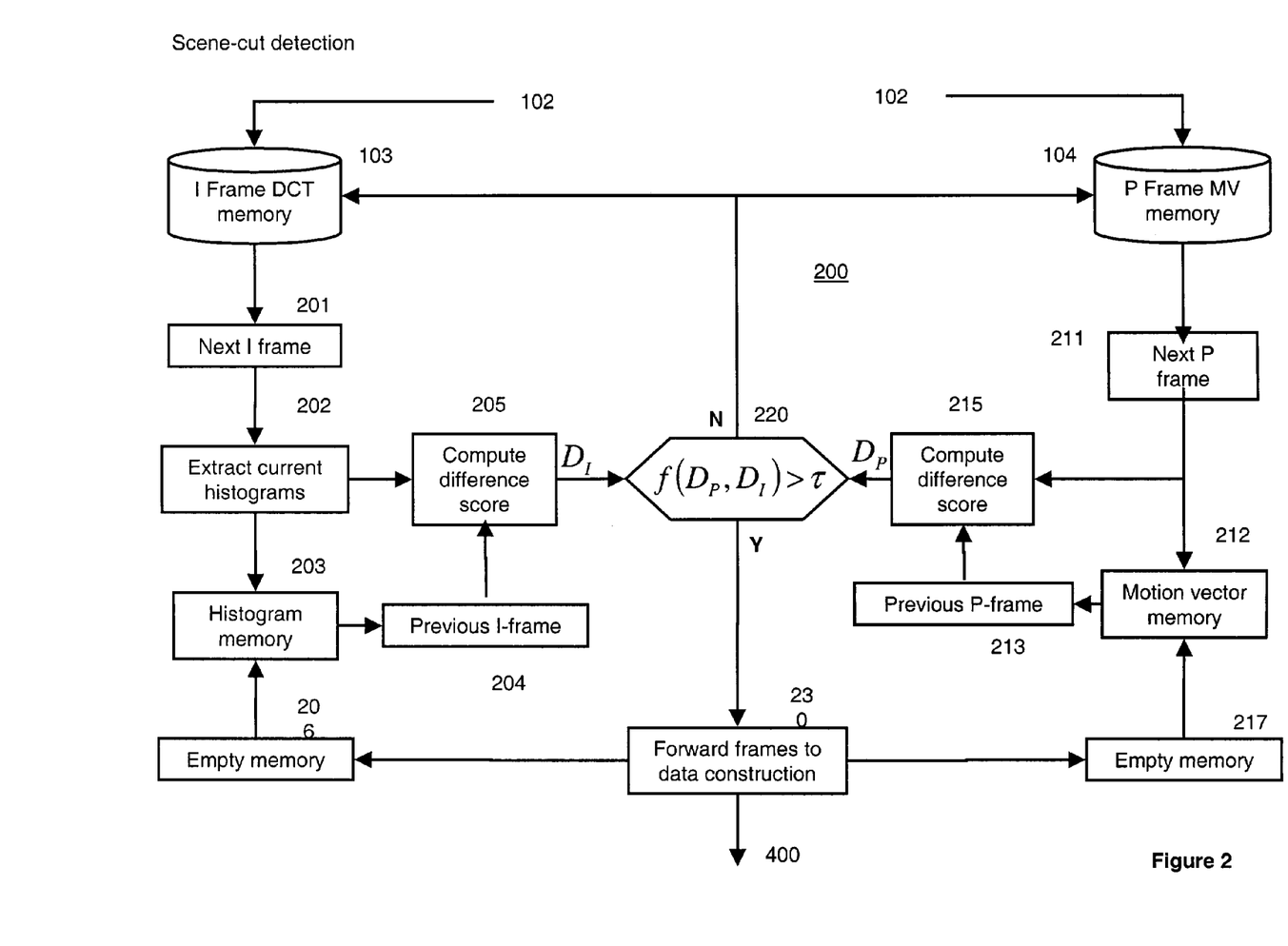
FIG. 2 is a block diagram of shot detection process used by the method of FIG. 1.
Figure 3:
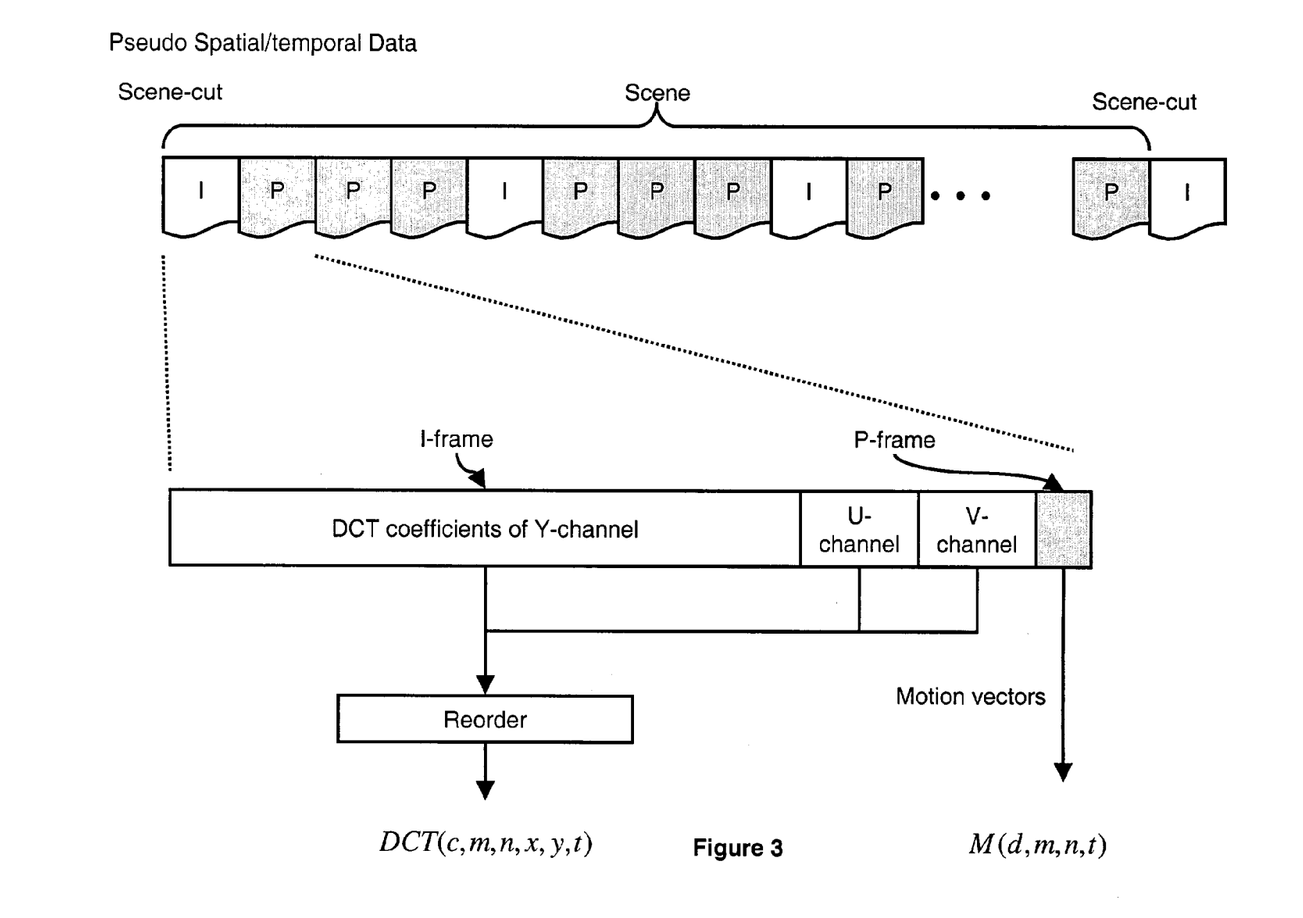
FIG. 3 is a block diagram of a process for constructing pseudo spatial/temporal data for the method of FIG. 1.

After a compressed video is parsed 102 into the I-frames and P-frames, a scene or 'shot' can detected 200 as shown in FIG. 2. Of course, if the video is a single scene, then shot detection is not required. The corresponding I-frames are stored into a memory 103, and the P-frames are stored into another memory while registering the frame time-line order.

A frame difference score is determined 205 for a pair of consecutive I-frames 103. DCT coefficient histograms of an I-frame 201 are extracted 202 for each of the corresponding color channels. Histograms are computed utilizing the DC components and/or additional DCT coefficients. These histograms are stored into a frame-wise ordered histogram memory 203. Then, the frame difference score is determined 205 between the current I-frame's histograms and the previous I-frame's histograms 204. To compute the histogram distance, a bin-by-bin or cross-bin metric can be used.

A motion difference score is determined 215 for a pair of P-frames 104 using the motion vectors of the current P-frame 211 and the previous P-frame 213. The motion vectors of the previous frames are stored into a motion vector memory 212. The motion difference score is defined as the difference of the motion vectors corresponding to same macro-block positions. In addition, motion of the frame can be modeled in terms of a parameterized model function, and then the motion distance can be determined by measuring the divergence of two model parameters as well.

The DCT-based 205 and motion vector based 215 differences are weighted and summed 220. If the total difference score is more than a preset threshold t, a shot is detected. The current data stored in both of the DCT and motion vector memories are forwarded 230 to a data construction process.

Using the parsed I and P frame data 203, 212, a pseudo spatial/temporal data is generated, and objects are segmented within this data. The DCT and motion vector memories are emptied or reset 206, 217, and the scene-cut detection process is repeated with the following I-frames and P-frames to find the location of the next scene-cut.

Pseudo Spatial/Temporal Data Construction (PST)

FIGS. 3–6 shows how spatial/temporal data (PST) 310 is constructed 300 for a scene 301 of the video 101. Here, the spatial component 311 is the DCT information, and temporal component 312 is the motion information. We denote the PST data as P(m, n, t, k) 310, where (m,n) stands for the macro-block index within the frame, t shows the frame number, i.e., distance from the start of the initial scene-cut frame, and k represents ordered 320 macro-block transformed coefficients. For an 8 by 8 macro-block, k=1, . . . , 64, and for a 16 by 16 macro-block, k=1, . . . , 256. Each macro block component includes a DCT coefficient and a motion vector. In other words, P(m,n,t) is a vector, also called as a tensor, that corresponds the macro-block (m,n,t). Thus, each macro-block has a tensor contains the spatial and temporal information. For a compressed video, the PST data are generated for a certain number of T frames between two scene-cuts, or the entire video if it is a single shot.

Using Only I-Frames

Figure 4:
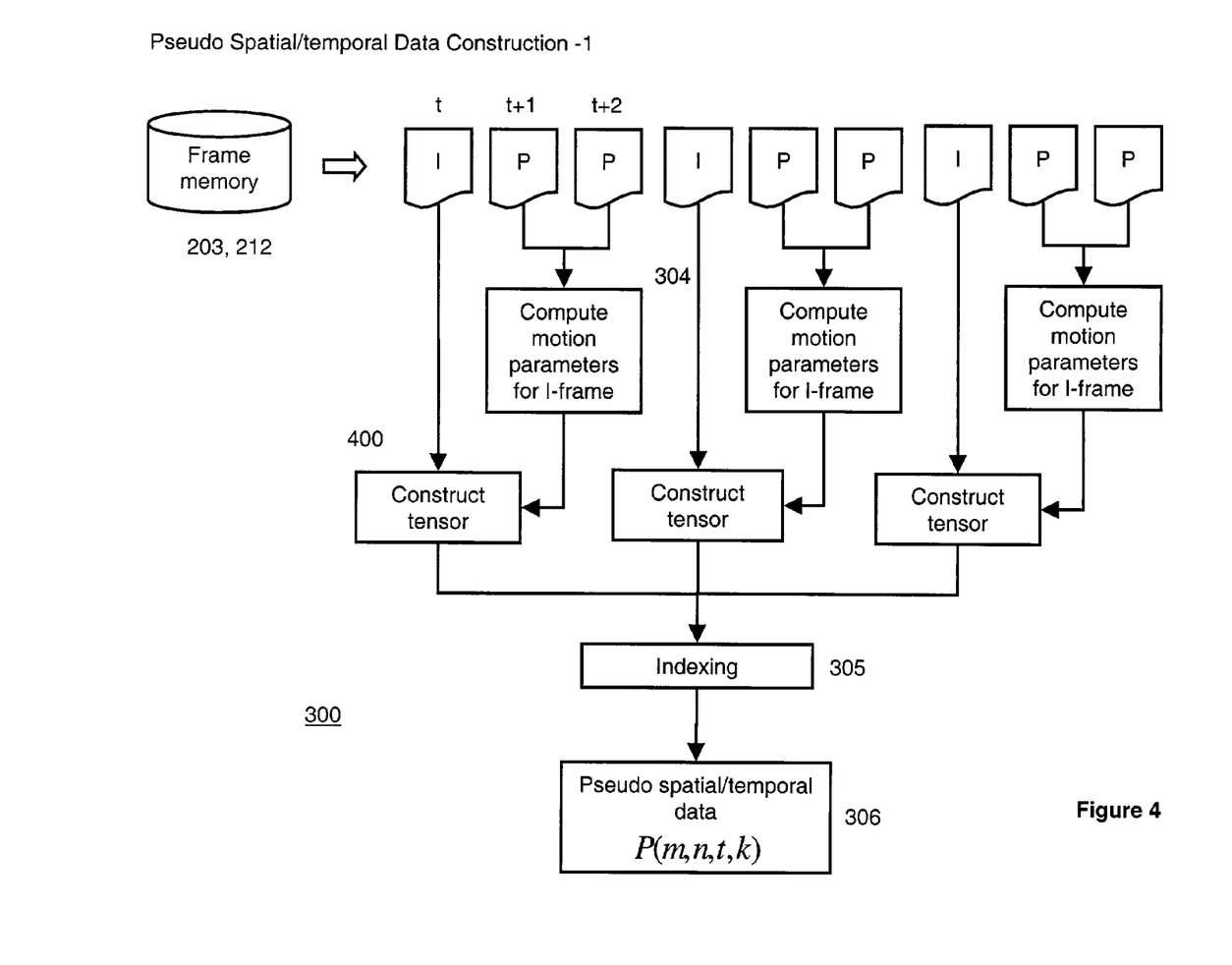
FIG. 4 is a block diagram of a process for constructing pseudo/spatial data for the method of FIG. 1.

As shown in FIG. 4, one process for generating the PST data 310 only uses the I-frame DCT coefficients stored in the I-frame memory 103, i.e., DCT(c,m,n,r,s,t) array, and remaps the components of this array such that each component of the PST tensor is equal to a DCT coefficient of the corresponding macro-block of the certain color channel, e.g., P(m,n,t,1)=DCT(Y,m,n,r1,s1,t), P(m,n,t,2)=DCT(Ym,n, r1,s2,t), . . . P(m,n,t,256+1)=DCT(U,m,n,r1,s1,t), . . . , P(m,n,t,256+64+1)=DCT(V,m,n,r1,s1,t), . . . , etc.

Using I and P-frames

Figure 5:
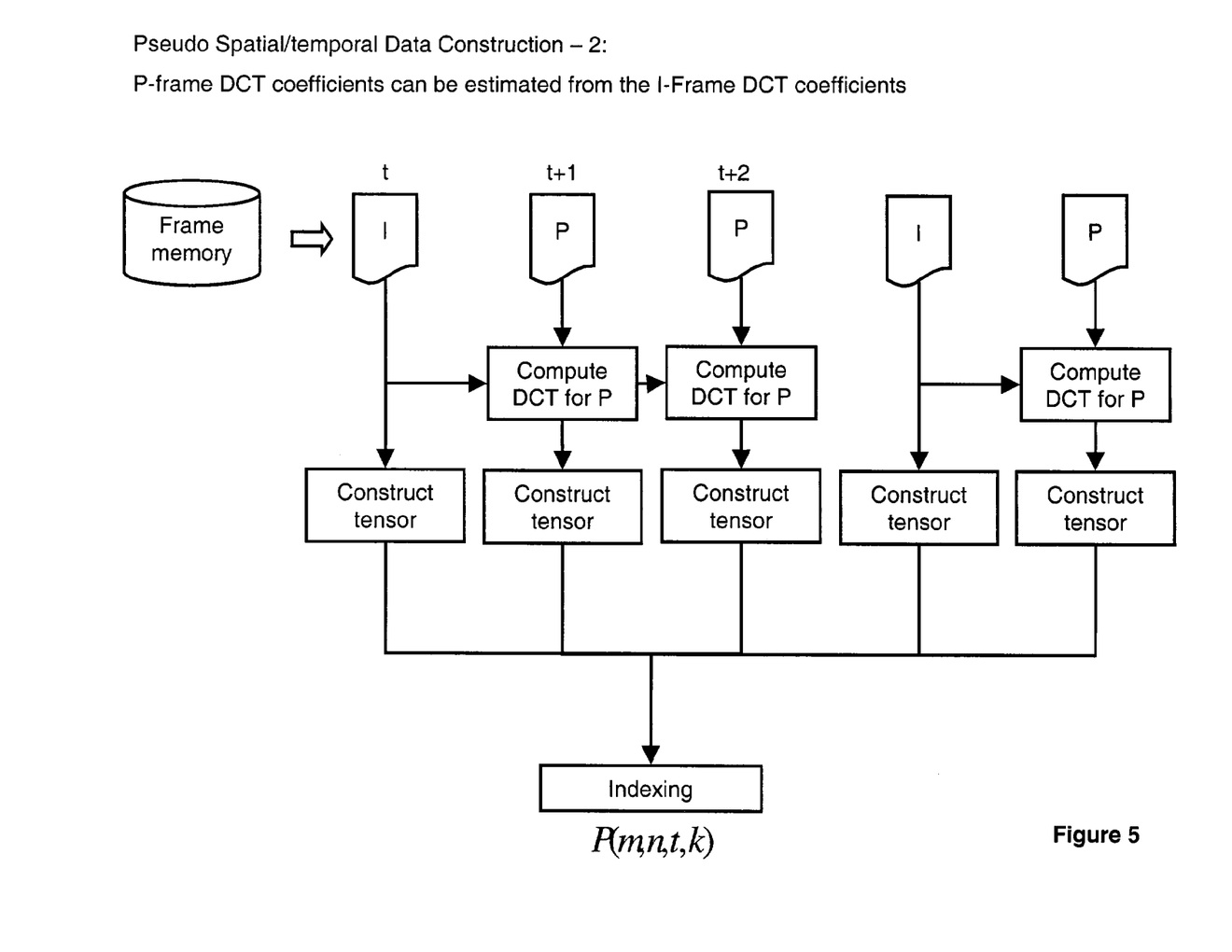
FIG. 5 is a block diagram of a process for estimating DCT coefficients for the method of FIG. 1.

There are two ways for generating the PST data 310 using I- and P-frames. The first way, as shown in FIG. 5, computes 501 P-frame DCT coefficients and then constructs 400 tensors that are indexed 520. Because there are no DCT coefficients for the P-frames, one process predicts the DCT coefficients of the P-frames using the motion vectors and the DCT coefficients of the previous I-frame. One way to predict DCT coefficients of the P frames is estimation by compensating I-frame data with respect to the motion vectors, and computing the weighted average of four possible macroblocks coefficients. Other methods can be used. A method for predicting the DCT coefficients of the P-frames in the compressed domain using filters is described by Sun et al., "A new approach for memory efficient ATV decoding, IEEE Trans. Consumer Electronics, pages 517–525, August 1997.

Then, the PST data 310 are constructed only from the DCT coefficients of the I-frames and the estimated DCT coefficients of the P-frames. The number of frames in the PST data is equal to the total number of I-frames and P-frames.

Figure 6:
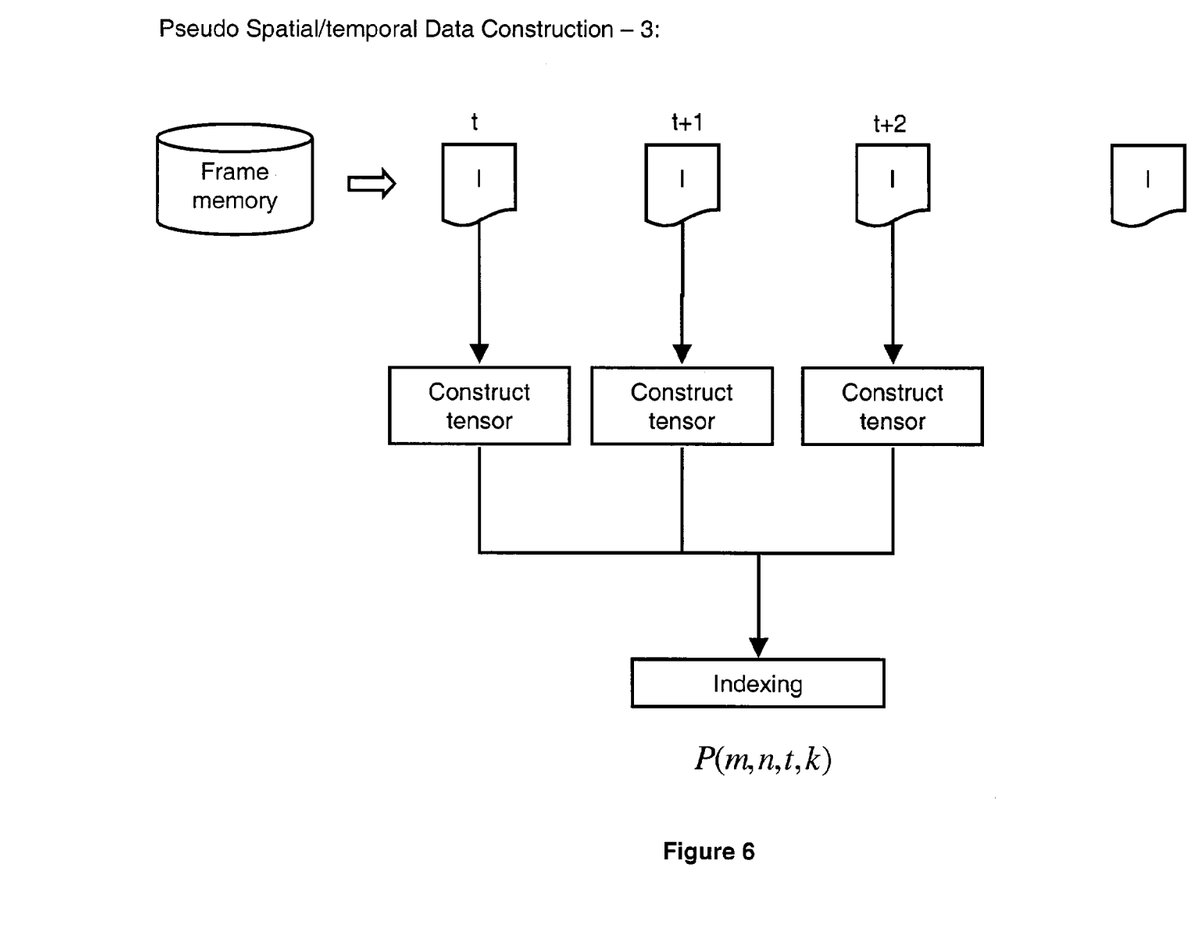
FIG. 6 is block diagram of a process for constructing tensors for I frames.

As shown in FIG. 6, a second process determines 610 motion parameters for the I-frames instead of estimating the DCT coefficients for the P-frames as above. Using the motion vector of the all of the P-frames between two consecutive I-frames, some motion parameters that model the motion of the macro-blocks of the I-frames are estimated.

Then, the PST data 310 are constructed by the DCT coefficients of I-frames and the estimated motion parameters of the macro-blocks. The number of frames of the PST data is equal to the number of the I-frames within the scene.

Spatial/Temporal Gradient

Figure 7:
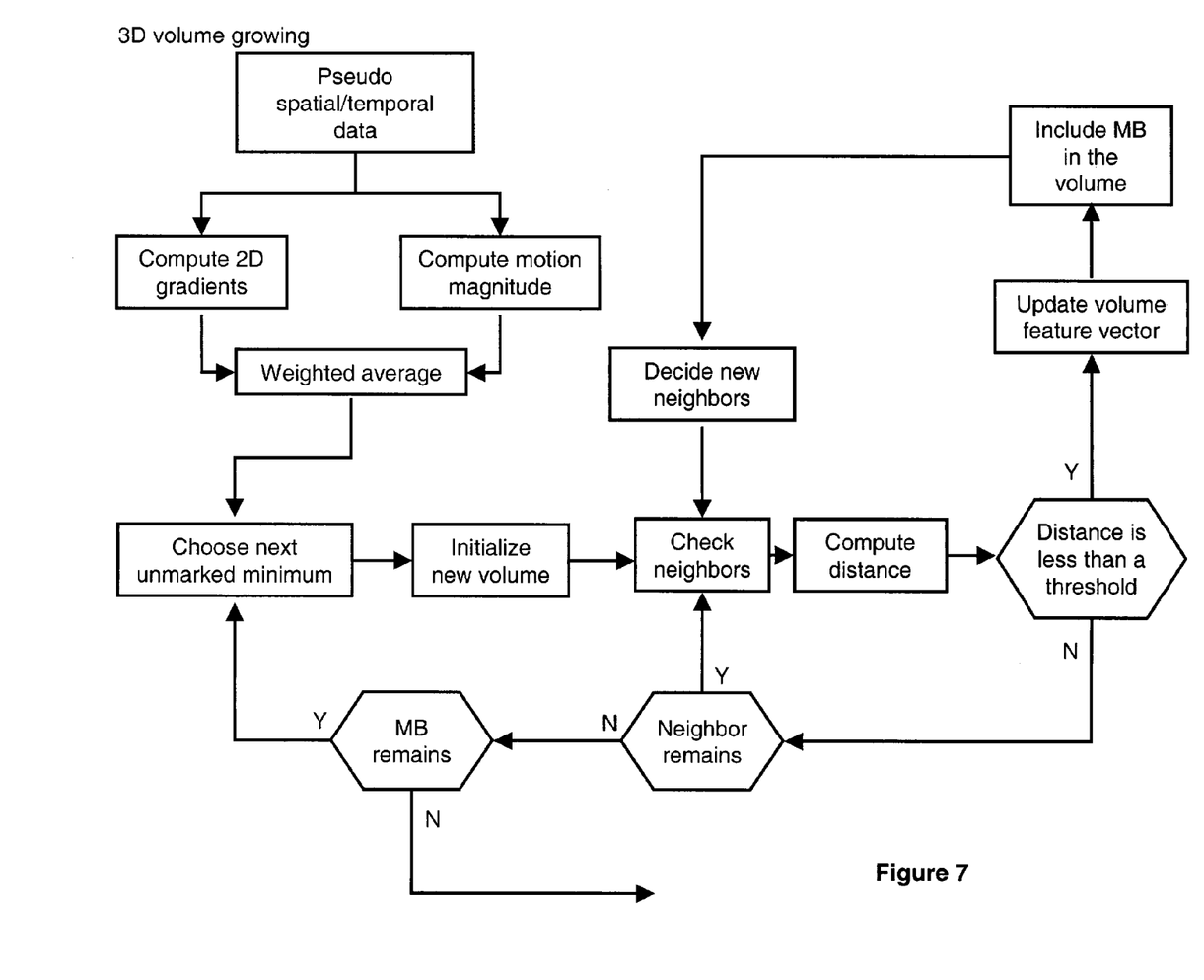
FIGS. 7 and 8 are block diagram of a volume growing process of the method of FIG. 1.

As shown in FIG. 7, to select 108 the seed macro blocks, first a spatial 701 and temporal 702 gradient magnitude is determined as $$|\nabla P(m, n, t, k)| = \sum_k w(k) \begin{bmatrix} \alpha_m |P(m+h, n, t, k) - P(m-h, n, t, k)| + \\ \alpha_n |P(m, n+h, t, k) - P(m, n-h, t, k)| + \\ \alpha_t |P(m, n, t+h, k) - P(m, n, t-h, k)| \end{bmatrix},$$

where w(k) is the weight of the corresponding component of the PST tensor, $\alpha_m$ and $\alpha_n$ are weights of the spatial components, and $\alpha_t$ is the weight of the temporal component. The derivative step size h can be equal to an integer number, preferably to 1.

Seed Macro-Block Selection

A macro-block (m,n,t) with a minimum spatial/temporal gradient magnitude min|∇P(m, n, t, k)| is selected 108 among the unsegmented macro-blocks of the PST data as a seed macro-block for volume growing. A volume V 109 is grown around the seed macro-block, and the macro-blocks belong to the grown volume are segmented out from the PST data.

The next minimum gradient magnitude macro-block in the remaining set of unsegmented macro-blocks is selected, and the growing process is repeated until no macro-block remains in the data set P.

Volume Growing

The volumes V are assembled around the seed macro-blocks (m,n,t) according to the features similarity criteria. For each volume V, a feature vector v which is same as the tensor of the seed macro-block is initialized 720 by v=P(m, n,t). This feature vector represents the properties of the volumes being grown, e.g., the features are the DCT coefficients, and the motion vectors. Then, neighbors or adjacent macro-blocks are checked 730.

Distances d(v,q) between tensors q=P(m,n,t) of adjacent macro-blocks and the feature vector v of the current volume V are measured 740 as d(v, q)=∥P(q)−v∥=∥P(m, n, t)−v∥. other also, where ∥•∥ means some distance function.

Compare 750 the distances to an adapted 107 threshold. If the distance d greater than the threshold, then check 760 for any remaining neighbors, and check 770 for remaining macro-blocks, and continue at A in FIG. 8.

Otherwise, if the distance d is smaller then a predetermined threshold λ, then update 780 the volume feature vector v, and include 790 the adjacent macro-block in the volume V. At the next iteration, only the active surface macro-blocks are evaluated 795 to increase the speed of the search.

The feature vector v for the seed macro-block is updated as $$d \leq \lambda \Rightarrow \begin{cases} \text{true} & v = \dfrac{Nv + P(m, n, t)}{N+1} \\ \text{false} & N = N+1 \end{cases}.$$

In the next iteration, the adjacent macro-blocks of the active surface macro-blocks are compared. This operation is repeated until all macro-blocks in the PST data are processed. The above process assembles adjacent macro-blocks with similar feature vectors as the seed macro-block into the same volume. The location of each assembled volume is designated by the location of its seed macro-block.

Subsuming Small Volumes

Figure 8:
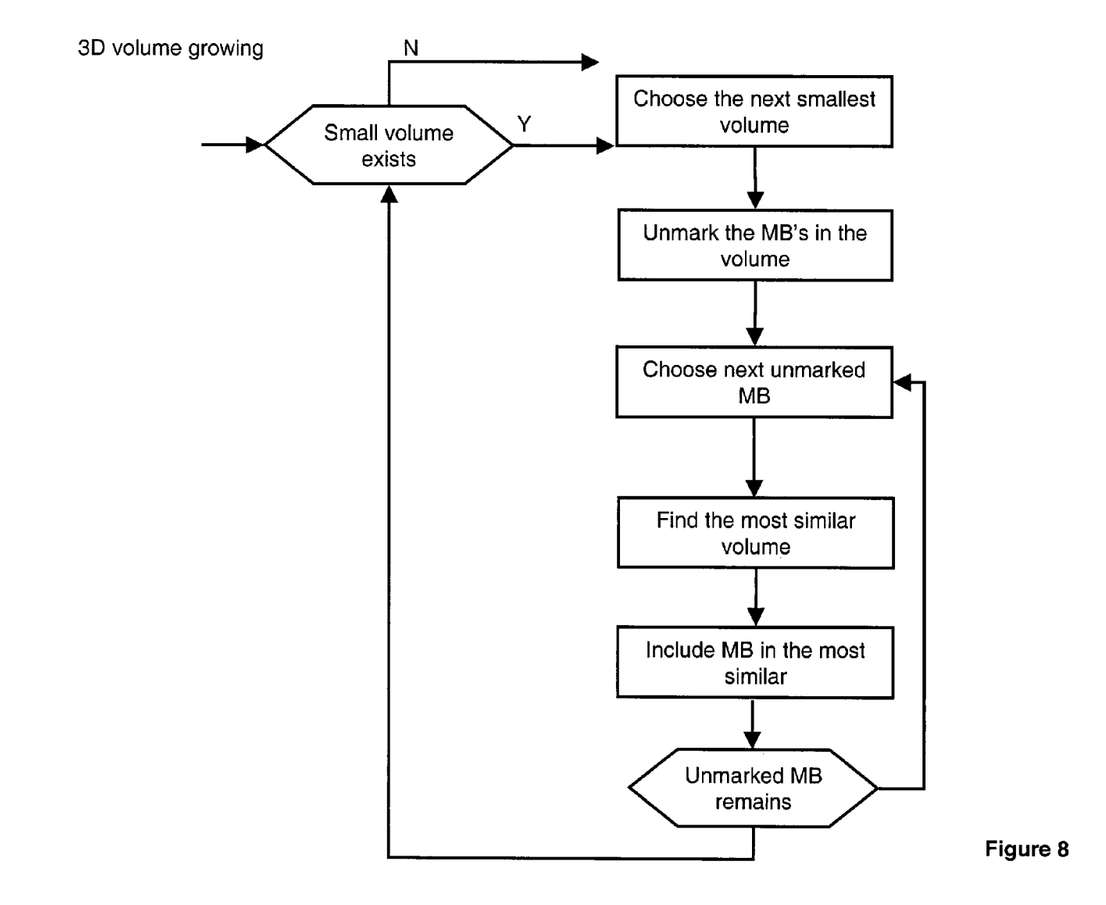

After the initial volumes are grown, the volume growing process continues at A as shown in FIG. 8 by testing 810 for small volumes. Volumes smaller than a predetermined size are merged into a larger similar volume as follows.

Figure 9:
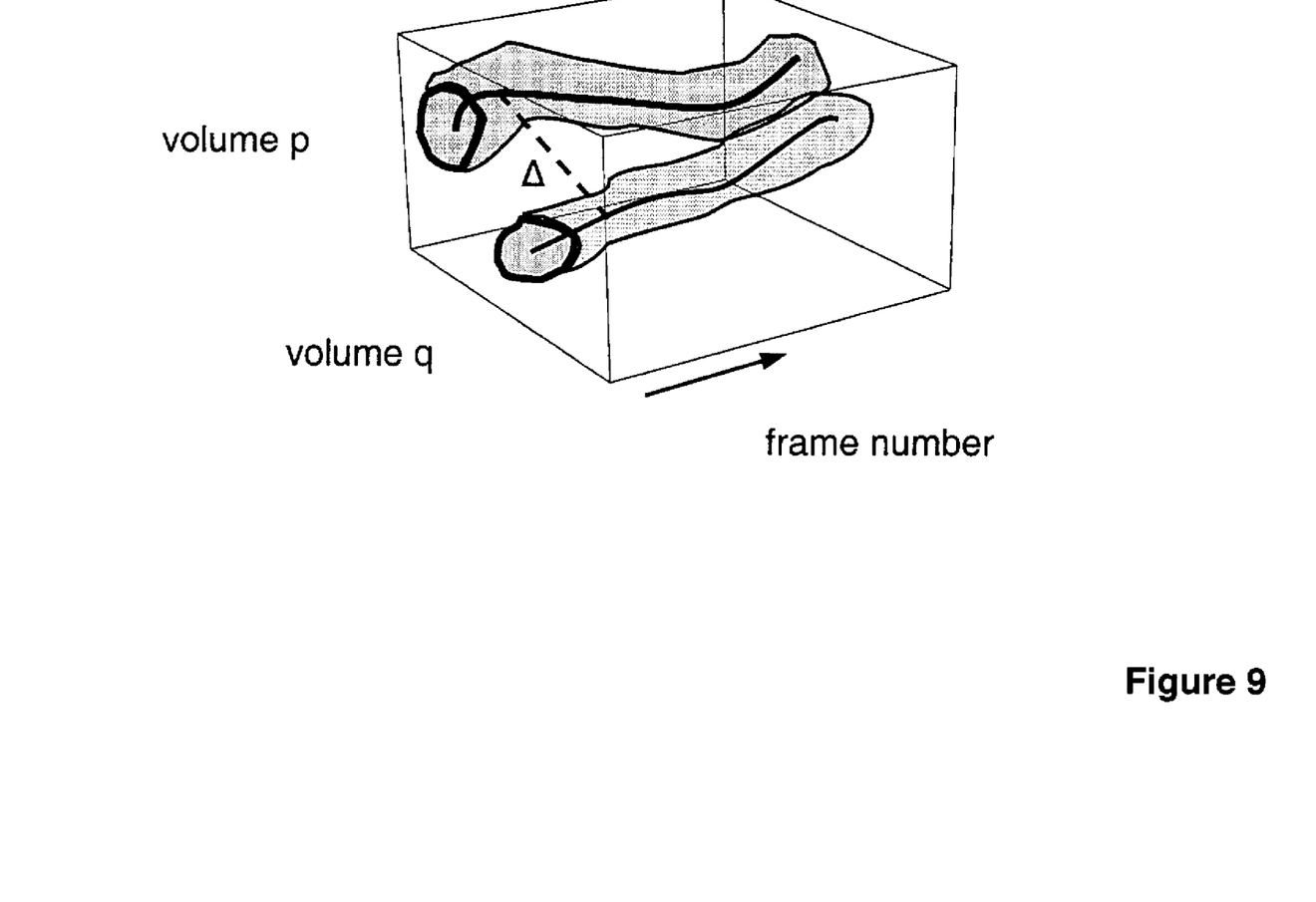
FIG. 9 is block diagram of a volume.

If there are no small volumes, then continue at B in FIG. 9. If there are small volumes, then select 820 the next smallest volume, unmark 830 its macro-blocks, select 840 the next unmarked macro-block, locate 850 a most similar larger volume, and include 860 the unmarked macro-blocks in that similar volume until no unmarked macro-blocks remain 870. The degree of similarity is based on the distance metric and feature vector as described above. In other words, the macro-blocks of a small volumes are individually dispersed and subsumed into volumes that most resemble the individual macro-block.

Volume Descriptors

Figure 10:
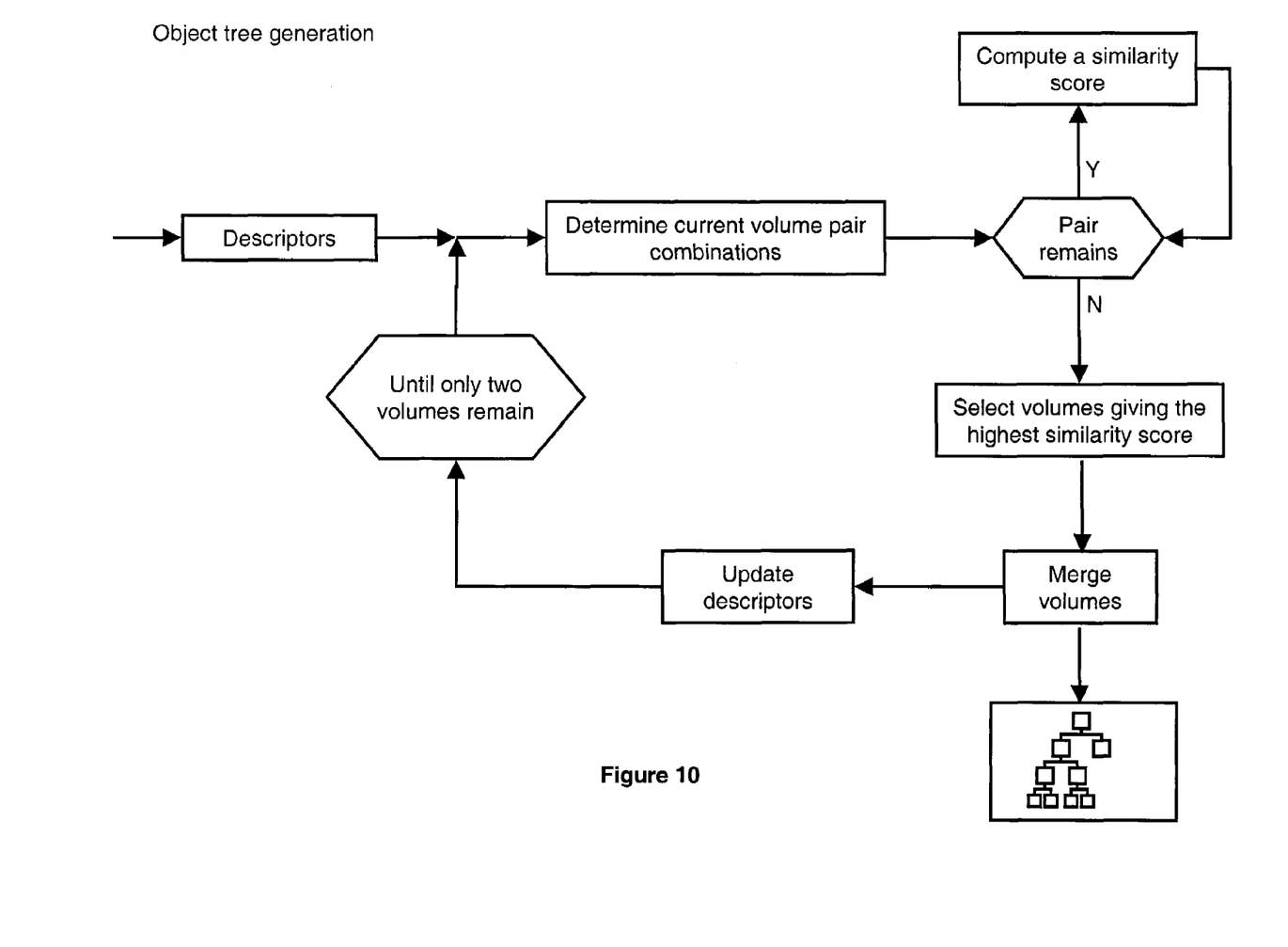
FIG. 10 is a block diagram of a process for generating an object tree used by the method of FIG. 1.

As shown in FIG. 9, we assign 910 a set of self descriptors F(V) to each volume V. A set of mutual descriptors F(Vp, Vq) is assigned to each possible volume pairs Vp 1001 and Vq 1002 as shown in FIG. 10. FIGS. 11 and 12 show the self and mutual descriptors, respectively. The descriptors are utilized to identify the motion trajectory, shape, volumetric, DCT-wise, and motion-wise characteristics of the volumes, as well as the mutual correlation between any pair of volumes.

In FIG. 10, the lines 1011 and 1012 indicate the trajectories of the respective volumes, and the dashed line 1030 indicates a distance Δ between the trajectories 1011–1012 in a particular frame. The trajectories Traj 1011–1012 are determined for each volume V by averaging the vertical and horizontal coordinates of macro-blocks inside the volume, frame-wise, as described below. Instead of averaging, other center-of-mass definitions can also be used.

Self Descriptors

In FIG. 11, the self-descriptor $SD_1(V,k)$ is a 2D matrix that includes the DCT component averages of the macro-blocks in the volume. The DCT coefficient mean (average) includes all 256 DCT components and/or motion parameters for a 16 by 16 macro-block.

$SD_2(V)$ is the number of macro-blocks in a volume.

$SD_3(V)$ is the number of macro-blocks on the surface of the volume.

A first compactness is defined as a ratio of volume to squared surface area is $SD_4(V)$.

A second compactness descriptor $SD_5(V)$ is defined by using maxcord instead of surface. For further detail on the preferred compactness measure, please see U.S. patent application Ser. No. 09/826,048 *"Method for Determining Compactness Ratios of Multiple Data and Signal Sets"* filed by Porikli on Apr. 4, 2001, incorporated herein by reference. Maxcord is a length of a longest cord that can fit in the volume.

$SD_6(V)$ and $SD_7(V)$ describe the trajectory of a volume in horizontal direction and vertical direction, respectively, for the sequence of frames.

$SD_8(V)$ is the total length (route length) of the trajectory.

$SD_9(V)$ and $SD_{10}(V)$ are averaged coordinates of the volume's macro-blocks.

Mutual Descriptors

As shown in FIG. 12, mutual descriptors MD(Vp, Vq) express the spatial, shape, motion, color relation between volumes.

$MD_{11}$(Vp, Vq) is the averaged distance between the trajectories of volumes Vp, Vq by summing the distance Δ 1030 of trajectories at each frame where both volumes exist.

The variance of trajectory distance is $MD_{12}$(Vp, Vq), and its maximum is $MD_{13}$(Vp, Vq).

Average change in distance $MD_{14}$(Vp, Vq) stands for the accumulated distance change of trajectories between frames. Direction of a volume is the vector pointing from the volume's center-of-mass in the last frame to the center-of-mass of the volume in the frame where it existed.

Direction difference $MD_{15}$(Vp, Vq) is the distance of such two vectors associated with the volumes Vp, Vq.

$MD_{16}$(Vp, Vq) expresses the compactness of the mutual volume in terms of the average of their separate compactness scores.

$MD_{17}$(Vp, Vq) and $MD_{18}$(Vp, Vq) are mutual volume and surface.

$MD_{19}$(Vp, Vq) is the color difference, and $MD_{20}$(Vp, Vq) is the number of frames both volume coexists.

Volume Merging

FIG. 9 shows how volumes are merged in order to segment the video into multi-resolution 3D video objects. For each volume V, we determine a trajectory Traj(p,t)=(x, y)$_t$ by taking the spatial averages of the volume's macro-blocks on a per frame basis.

$$Traj(p, t) = (m, n)_t = \left( \frac{1}{N} \sum_{p \in V, t} m, \frac{1}{N} \sum_{p \in V, t} n \right).$$

Then, the distance Δd(p,q,t) between the trajectories of two volumes Vp and Vp, at time t is Δd(p, q, t)=|Traj(p, t)−Traj(q, t)|.

The motion information, such as, vertical and horizontal motion, route length, mean and variance of distance, direction difference, and average change in the distance are extracted from the trajectories.

Therefore, without estimating motion by optical flow, parametric models or extensive search-based matching methods as in the prior art, our method uses the motion information efficiently.

The merging step produces segmented 3D video objects by iteratively merging volumes having substantially similar volumes descriptors. The preferred merging is pair-wise, although other merging strategies can also be used.

First, determine 920 a current combination of a volume pair until no pairs remain 930. The descriptors of the volumes V are scored and sorted 940 with respect to weighted averages of their sizes, compactness and existence values. The list 941 is sorted in a high-to-low order.

Selecting 950 volumes Vin the sorted list 941 having the highest similarity scores, the volume are processed as follows, until a single volume remains.

During the merging 960, the descriptors of the current volume are compared to the descriptors of its adjacent volumes. For a relational descriptor, similarity scores of the possible merges are computed. These scores are formed in the corresponding descriptor-wise lists. Then each list is ordered starting from the highest similarity score. The rank $R_k$(Vp,Vq) of the possible merges Vp,Vq in each mutual descriptor list are determined.

For each possible pair of merged volumes, a total similarity score is determined as $$Sim(Vp, Vq) = \sum_k b(k) R_k(Vp, Vq),$$

where weights b(k) are used to normalize and adjust the contribution of each descriptor. These multipliers can be adapted to the specific applications as well. The pair having the maximum similarity are merged 960, and the descriptors of the volumes are updated 970.

Merging is performed until only two volumes remain 980. At any level of the merging, we can analyze whether the selected pair of volumes is a good choice. This can be done by observing the behavior of the similarity score of the selected merged volume. If this score becomes small or shows a sudden decrease, the merge is likely invalid, although it is the best available merge.

As the volumes are merged, the video object tree 990 can be generated 111 using known techniques. If the merging is pair-wise as described above, then the tree is a binary tree. If the merging is four volumes at the time, then the tree is a quad-tree. Other tree structures can result depending on the way the volumes are merged.

In the preferred embodiment, the only the tree structure is maintained, and the volumes remain as bottom level leaf nodes. Then, an application can merge the volumes up to any desired level, as needed, using the video object tree. For example, if a single volume is desired, then the volumes are merged up to the root node of the tree.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for segmenting a three dimensional object from a compressed video, the compressed video including a plurality of frames separated in time, and each frame including a plurality of macro-blocks separated in space, comprising:
    parsing transformed coefficients for each macro block;
    determining a spatial/temporal gradient for each macro-block based on the transformed coefficients;
    selecting a particular macro-block with a minimum spatial/temporal gradient magnitude as a seed macro-block;
    measuring distances between the seed macro-block and spatially and temporally adjacent macro-blocks based on the transformed coefficients; and
    growing a volume around the seed macro-block using the adjacent macro-blocks having distances less than a predetermined threshold.

2. The method of claim 1 wherein the plurality of frames are a single shot.

3. The method of claim 1 wherein the plurality of frames include I-frames having DCT coefficients.

4. The method of claim 3 wherein the plurality of frames include P-frames including motion vectors.

5. The method of claim 1 wherein the transformed coefficients are wavelets.

6. The method of claim 1 wherein the transformed coefficients are fast Fourier transform coefficients.

7. The method of claim 1 wherein there is a set of transformed coefficients for each color channel of the compressed video.

8. The method of claim 2 wherein the single shot is detected from the transformed coefficients.

9. The method of claim 4 wherein the transformed coefficients of each macro-block are represented as spatial/temporal data P(m, n, t, k), where (m,n) represents a macro-block index within a particular frame t, and represents a particular set of transformed coefficients within the macro-block.

10. The method of claim 9 wherein the spatial/temporal gradient magnitude is determined as $$|\nabla P(m, n, t, k)| = \sum_{k} w(k) \begin{bmatrix} \alpha_m |P(m+h, n, t, k) - P(m-h, n, t, k)| + \\ \alpha_n |P(m, n+h, t, k) - P(m, n-h, t, k)| + \\ \alpha_t |P(m, n, t+h, k) - P(m, n, t-h, k)| \end{bmatrix},$$

where w(k) is a weight of a corresponding set of transformed coefficients, $\alpha_m$ and $\alpha_n$ are weights of the DCT coefficients, $\alpha_t$ is a weight of the motion vector, and h is a derivative step size.

11. The method of claim 10 wherein the minimum spatial/temporal gradient magnitude is min|∇VP(m, n, t, k)|.

12. The method of claim 1 wherein the selecting, measuring, and growing are repeated until no macro-blocks remain to generate a plurality of volumes.

13. The method of claim 9 wherein the distance between the seed macro-block v and a particular adjacent macro-block q is d(v, q)=∥P(q)−v∥=∥P(m, n, t)−v∥, where ∥•∥ is a particular distance function.

14. The method of claim 13 further comprising:
updating a feature vector v for the seed macro-block while growing the volume as $$d \leq \lambda \Rightarrow \begin{cases} \text{true} & v = \dfrac{Nv + P(m, n, t)}{N+1} \\ \text{false} & N = N+1 \end{cases},$$

where d is the measured distance, λ is the threshold, and N is a next adjacent macro-block.

15. The method of claim 12 further comprising:
subsuming individual macro-blocks of a particular volume smaller than a predetermined size into larger similar ones of the plurality of volumes.

16. The method of claim 1 further comprising:
assigning a set of self descriptors to the volume.

17. The method of claim 16 wherein the self descriptors include an average of the transformed coefficients of the macro-blocks in the volume, a number of macro-blocks in the volume, a number of macro-blocks on a surface of the volume, a compactness ratio of the volume, a trajectory of the volume, a length of the trajectory, and averaged coordinates of the macro-blocks of the volume.

18. The method of claim 12 further comprising:
assigning a set of mutual descriptors to each possible pair of volumes.

19. The method of claim 18 wherein the mutual descriptors include an average distance between trajectories of the pair of volumes, a variance of the distance of the trajectories, a maximum distance between the trajectories, an average change in the distance between the trajectories, an accumulated distance change of the trajectories, a compactness of the pair of volumes, a color difference between the pair of volumes, a number of frames where the pair of volumes coexists.

20. The method of claim 12 further comprising:
assigning a set of self descriptors to the volume; and
assigning a set of mutual descriptors to each possible pair of volumes.

21. The method of claim 20 further comprising:
merging the plurality of volumes according to the set of self descriptors and the set of mutual descriptors to segment the compressed video into a multi-resolution 3D video objects.

22. The method of claim 21 wherein the merging is pair-wise.

23. The method of claim 21 wherein the merged volumes are maintained in a video object tree.

* * * * *